(12) United States Patent
Sakakibara (10) Patent No.: US 6,362,600 B2
(45) Date of Patent: Mar. 26, 2002

(54) BATTERY CHARGING DEVICE

(75) Inventor: Kazuyuki Sakakibara, Aichi-Ken (JP)

(73) Assignee: Makita Corporation, Anjo (JP)

(*) Notice: Subject to any disclaimer, the term of this patent is extended or adjusted under 35 U.S.C. 154(b) by 0 days.

(21) Appl. No.: 09/766,881

(22) Filed: Jan. 18, 2001

(30) Foreign Application Priority Data

Jan. 24, 2000 (JP) ...................................... 2000-014418

(51) Int. Cl.$^7$ ................................................. H02J 7/16
(52) U.S. Cl. ...................................... 320/150; 320/135
(58) Field of Search ............................... 320/150, 144, 320/137, 128, 127, 119, 116, 151, 152

(56) References Cited

U.S. PATENT DOCUMENTS

| | | | | |
|---|---|---|---|---|
| 5,497,068 A | * | 3/1996 | Shiojima | 320/150 |
| 5,652,500 A | * | 7/1997 | Kadouchi et al. | 320/150 |
| 5,739,673 A | | 4/1998 | Le Van Suu | 320/139 |
| 5,886,527 A | | 3/1999 | Ito | 324/431 |
| 5,912,547 A | | 6/1999 | Grabon | 320/150 |
| 6,225,786 B1 | * | 5/2001 | Muramatsu et al. | 320/150 |
| 6,265,850 B1 | * | 7/2001 | Kimura et al. | 320/150 |
| 6,278,261 B1 | * | 8/2001 | Sakakibara | 320/150 |

FOREIGN PATENT DOCUMENTS

| | | |
|---|---|---|
| JP | 04011138 | 1/1992 |
| JP | 04293693 | 10/1992 |
| JP | 08164597 | 6/1996 |
| WO | WO 93/14548 | 7/1993 |

* cited by examiner

*Primary Examiner*—Peter S. Wong
*Assistant Examiner*—Lawrence Luk
(74) *Attorney, Agent, or Firm*—Lyon & Lyon LLP (57) ABSTRACT

In a battery charging device 10 capable of detecting abnormalities in cells comprising batteries through a simple arrangement and terminating charge accordingly, cell temperature information Ta and cell temperature information Tb in charging operation within respective blocks A and B are detected through temperature sensors TM1, TM2 and a temperature detecting portion 38 incorporated in a battery package 50, the cell temperature information Ta of block A and cell temperature information Tb of block B are compared through a comparing/determining portion 35 wherein upon determining that temperature difference information Tdf is exceeding reference information for comparison Tref, instructions for terminating charging operations are sent from a control portion 36 to a charge current controlling portion 34 assuming that abnormalities have occurred in the cells comprising the block A or block B during charging operations. With this arrangement, it is possible to detect a block including abnormal cells whose temperature does not rise or fall within a specified range together with remaining cells within the same block and to detect inconveniences of charge circuits or the like that performs charge upon division into blocks, and to terminate charging operations for the battery package 50.

2 Claims, 5 Drawing Sheets

BATTERY CHARGING DEVICE

BACKGROUND OF THE INVENTION

1. Field of the Invention

The present invention relates to a battery charging device for charging batteries comprised of a plurality of cells, and to a battery charging device that is capable of terminating charge upon detection of abnormalities of cells or inconveniences of the battery charging device or the like.

2. Discussion of the Prior Art

It is conventionally known to use batteries accumulating therein rechargeable cells that may be repeatedly used as power sources for power tools or the like. In order to generate a power source voltage that is required by the power tools or the like, it is general that the batteries are comprised of a plurality of cells of identical types combined either in a serial or parallel manner. Thus, it is considered that performances of the plurality of cells comprising the batteries are degraded in a substantially identical manner by repeating charge and discharge operations of the batteries.

However, since such cells comprising the batteries are arranged to generate electricity by utilizing chemical reaction in forms of nickel cadmium batteries or nickel metal hydride batteries, electric characteristics at the time of charge and discharge are widely varied so that it is extremely difficult to achieve an arrangement in which charge/discharge characteristics of a plurality, for instance, more than ten of cells are adjusted to be identical. It may thus happen that charge/discharge characteristics of some of the cells comprising the batteries remarkably differ from those of other cells upon repeatedly using the batteries. The possibilities that such cells degrade in performances prior than other cells is accordingly high.

It is not only through chemical factors but also through environments for using the power tools or the like that a part of the cells comprising the batteries is mechanically damaged when oscillation or shock is applied on the batteries that exceeds a presumed level or when the user erroneously drops the batteries. It may be that such mechanically damaged cells are degraded in performances when compared with other cells.

However, a battery charging device for charging batteries comprised of such cells generally employs a method of performing charge of all of the plurality of cells comprising the batteries in one lump sum. Thus, partial degradations in performances can be hardly conceived from the charge characteristics of the batteries as a whole even if a part of the cells should be degraded in performances, and it had so far been difficult to detect whether the plurality of cells comprising the batteries included cells with degraded performances. Though it may seem that it is possible to cope with such problems by providing a breakdown detecting circuit for each of the plurality of cells comprising the batteries, such a measure lacks in practicability since it would not only lead to a complicated circuit arrangement for the batteries and the battery charging device but would also increase costs for manufacturing the batteries and other members.

In a battery charging device employing a method of performing charge upon dividing the plurality of cells into two or more groups of cells, charge is individually performed by dividing the plurality of groups of cells further into two or more. Due to this arrangement, it is generally the case that a circuit for detecting inconveniences that may be generated in the charging circuit or the like is provided on the battery charging device side for detecting such inconveniences, while this arrangement provides a drawback in view of circuit arrangement, namely that the circuit arrangement for the battery charging device becomes complicated.

SUMMARY OF THE INVENTION

The present invention has thus been made for solving the above drawbacks, and it is an object thereof to provide a battery charging device that is capable of terminating charge upon detection of abnormalities of cells comprising batteries through a simply arrangement.

It is another object of the present invention to provide a battery charging device that is capable of terminating charge upon detection of inconveniences of the battery charging device or the like through a simply arrangement.

In order to achieve the above objects, according to the present invention, a battery charging device for charging batteries comprised of a plurality of cells, the battery charging device comprising:

a temperature detecting portion for detecting cell temperatures during charging operations within groups of cells for each of groups of cells in which a plurality of cells has been divided into two or more, a comparing portion for comparing the cell temperature of one group of cells with that of another group of cells, a determining portion for determining whether a temperature difference between the cell temperatures as compared by the comparing portion is exceeding a specified value or not, and a control portion for terminating charge when it is determined by the determining portion that the temperature difference between cell temperatures is exceeding the specified value.

In order to achieve the above objects, according to the present invention, a battery charging device for performing charge of batteries comprised of a plurality of cells upon dividing the cells into two or more groups of cells, the battery charging device comprising:

a temperature detecting portion for detecting cell temperatures during charging operations within groups of cells for each of groups of cells, a comparing portion for comparing the cell temperature of one group of cells with that of another group of cells, a determining portion for determining whether a temperature difference between the cell temperatures as compared by the comparing portion is exceeding a specified value or not, and a control portion for terminating charge when it is determined by the determining portion that the temperature difference between cell temperatures is exceeding the specified value.

In an invention, a temperature detecting portion detects cell temperatures within groups of cells in charging operations for each of groups of cells in which a plurality of cells has been divided into 2 or more, a comparing portion compares the cell temperature of one group of cells with that of another group of cells, a determining portion determines whether a temperature difference between cell temperatures as compared by the comparing portion is exceeding a specified value or not, and when it is determined by the determining portion that the temperature difference between cell temperatures is exceeding the specified value, charging of the batteries is terminated by a control portion. More particularly, charging of the batteries is terminated when it is determined that the temperature difference between the cell temperature of one group of cells and the cell temperature of another group of cells is exceeding a specified value.

In this manner, by performing determination of cell temperature differences during charging operations through a relatively simple arrangement comprised of the temperature detecting portion, the comparing portion, determining portion and the control portion, it is possible to detect a group of cells including cells whose temperature does not rise or fall within a specified range similarly to remaining cells within the same group of cells, that is, abnormal cells and to terminate charging of the batteries.

In an invention, a temperature detecting portion detects cell temperatures within groups of cells in charging operations for each of groups of cells in which a plurality of cells has been divided into 2 or more, a comparing portion compares the cell temperature of one group of cells with that of another group of cells, a determining portion determines whether a temperature difference between cell temperatures as compared by the comparing portion is exceeding a specified value or not, and when it is determined by the determining portion that the temperature difference between cell temperatures is exceeding the specified value, charging of the batteries is terminated by a control portion. More particularly, charging of the batteries is terminated when it is determined that the temperature difference between the cell temperature of one group of cells and the cell temperature of another group of cells is exceeding a specified value. In this manner, by performing determination of cell temperature differences during charging operations through a relatively simple arrangement comprised of the temperature detecting portion, the comparing portion, the determining portion and the control portion, it is possible to detect cells including cells whose temperature does not rise or fall within a specified range similarly to remaining cells within the same group of cells. It is therefore possible to detect a group of cells including abnormal cells, to detect inconveniences of the charge circuit or the like for performing charge upon dividing into respective groups of cells, and to terminate charging operations of the batteries.

BRIEF DESCRIPTION OF THE DRAWINGS

FIG. 7 is a view illustrating a substrate portion that is incorporated into the battery package according to the above embodiment wherein

DESCRIPTION OF THE PREFERRED EMBODIMENT

Figure 1:
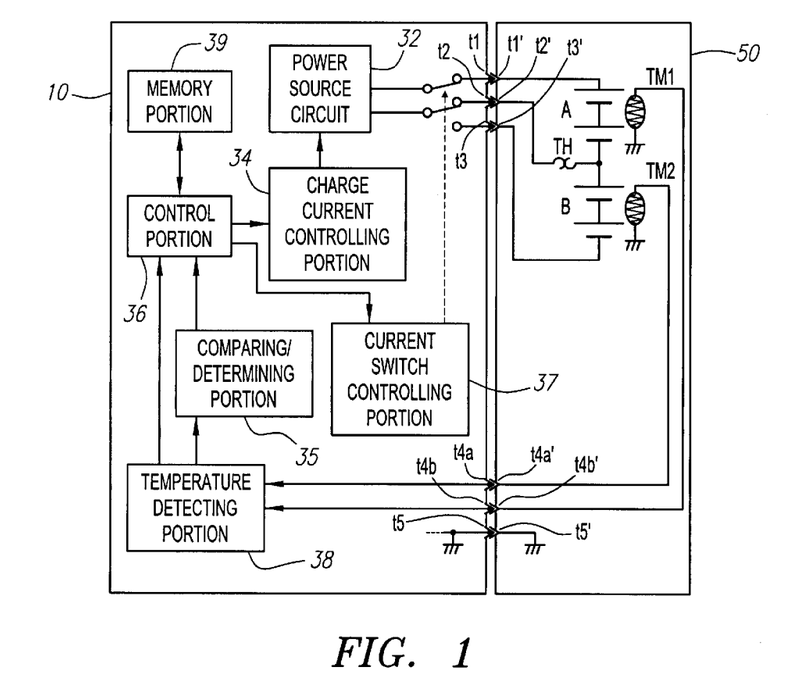
FIG. 1 is a block diagram illustrating a control circuit for the battery charging device according to one embodiment of the present invention.

The battery charging device according to an embodiment of the present invention will now be explained with reference to the drawings. FIG. 1 illustrates a control circuit block of the battery charging device 10 according to the present embodiment, and FIG. 2 an external appearance of the battery charging device 10. FIG. 3 illustrates an external appearance of a battery package 50 that is charged by using the battery charging device 10 and FIG. 4 a battery-driven drill 70 that is driven by the battery package 50.

The arrangement of the battery package 50 that is charged by using the battery charging device 10 will now be explained with reference to FIG. 3 and FIGS. 5 to 7.

As illustrated in FIG. 3, the battery package 50 is comprised by incorporating nickel metal hydride batteries that are electrically connected in a serial manner as a plurality of cells (herein after referred to as "group of cells" in the embodiment) within a casing 51 made of resin having a substantially prism-like shape, wherein the group of cells is divided into two blocks A and B with temperature sensors TM1, TM2 for detecting cell temperatures within the blocks being provided for each of the blocks (see FIGS. 5 and 6).

Fitting portions 52, which are formed with fitting grooves 53 that may be fit to opponent sides when mounting the casing 51 to the battery-driven drill 70 or the battery charging device 10, are formed on an upper end side of the casing 51 to be parallel to each other in a rail-like manner while a hook 54 that is extractable/insertable in vertical directions is provided on a portion located on one end side of the fitting portions 52. The hook 54 is integrally formed with a lever 55 that is provided on a lateral surface of the casing 51 and is urged in a projecting direction by means of a coil spring (not shown). In this manner, the battery package 50 may engage with specified hook grooves that are formed on these members when the battery package 50 is attached to the battery-driven drill 70 or the battery charging device 10.

This arrangement enables it to prevent the battery package 50 from easily coming off the battery-driven drill 70 or the battery charging device 10. Accompanying the pressing of the lever 55 in a lower end direction of the casing 51 against the urging force of the coil spring, the hook 54 will simultaneously move in the lower end direction to be inserted such that the engagement with the hook groove is released and the battery package 50 may be detached from the battery-driven drill 70 or the battery charging device 10.

On the upper end side of the casing 51, there are further formed a ventilating aperture 56, a positive terminal groove 57, a central terminal groove 58, a negative terminal groove 59 and a connector 60 that are located in a pinched manner between the fitting portions 52.

The ventilating aperture 56 is formed on a position at which it may communicate with an air-blowing aperture 16 provided in the battery charging device 10 when the battery package 50 is mounted to the battery charging device 10. With this arrangement, air may be sent into the battery package 50 through a cooling fan that is incorporated in the battery charging device 10 so as to cool the battery package 50 during charging operations. In other words, this arrangement enables it to establish an air-cooling system of the battery charging device 10.

On the other hand, positive terminals t1', central terminals t2' and negative terminals t3' are respectively provided, by being fixed to a printed board 61 through soldering in the positive terminal groove 57, the central terminal groove 58 and the negative terminal groove 59 such that the terminals may contact with incoming terminals or output terminals of the opponent side when the battery package 50 is attached to the battery-driven drill 70 or the battery charging device 10.

The contact portions are formed to assume a shape of the letter V turned upside down (see FIG. 5) with two contact portions being provided each for the positive terminals t1' and negative terminals t2' and one for the central terminals t2'. The positive terminals t1' are electrically connected to a positive polar side of cell CL1 within the casing 51 and the negative terminals t3' to a negative polar side of cell CL20, while a lead plate 63 for obtaining an intermediate potential for the group of cells through thermostat TH is electrically connected to the central terminals t2' (see FIG. 7(B)). It should be noted that one end side of the lead plate 63 is electrically connected to a negative polar side of cell CL10 and the other end side thereof to a positive polar side of cell CL11.

With this arrangement of providing two contact portions in a shape of the letter V turned upside down for the positive terminals t1' and the negative terminals t3', the positive terminals t1' and negative terminals t3' may be electrically connected to power source terminals on the battery-driven drill 70 side in a reliable manner when the battery package 50 is attached to the battery-driven drill 70.

Further, the arrangement of respectively providing the positive terminals t1', the central terminals t2' and the negative terminals t3' within the positive terminal groove 57, the central terminal groove 58 and the negative terminal groove 59 enables it to prevent external short-circuiting between the positive terminals t1', the central terminals t2' and the negative terminals t3' of the battery package 50 when detached from the battery-driven drill 70 or the battery charging device 10.

Figure 5:
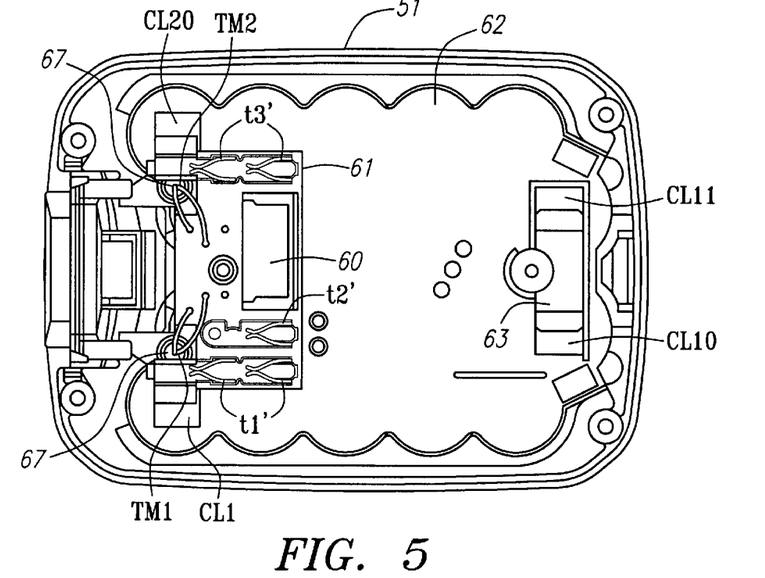
FIG. 5 is a plan view illustrating an interior of the battery package according to the above embodiment.

On the other hand, the connector 60 that is exposed to the upper end side of the casing 51 is also fixed to the substrate 61 within the casing 51 through soldering as illustrated in FIGS. 3 and 5. A plurality of connecting terminals (not shown) is provided in the interior of the connector 60 (see FIG. 7(A)). These terminals are used for sending specified information from the battery package 50 to the battery charging device 10 when the battery package 50 is attached to the battery charging device 10, the information being, for instance, temperature information obtained by the temperature sensors TM1, TM2 incorporated in the battery package 50 in the illustrated embodiment that are transmitted to the battery charging device 10 through the connecting terminals of the connector 60 (see FIG. 7(B)).

The temperature sensors TM1, TM2 incorporated in the battery package 50 will now be explained.

Figure 6:
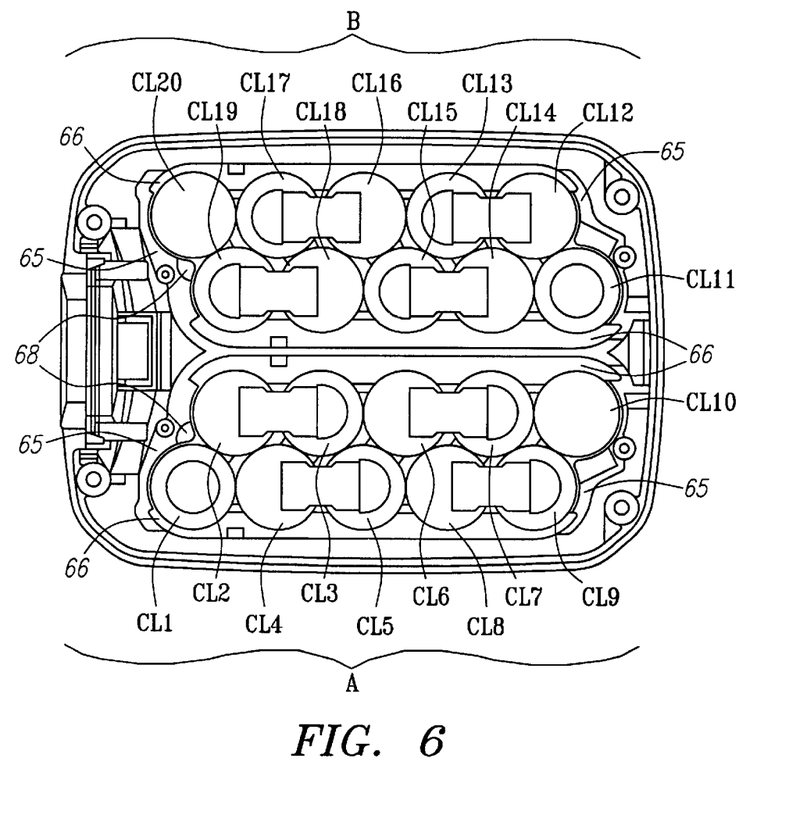
FIG. 6 is a plan view illustrating an interior of the battery package according to the above embodiment.

As illustrated in FIGS. 5 to 7, the temperature sensors TM1, TM2 serving as temperature detecting portions are comprised by thermistors wherein electrical resistance values vary depending, for instance, on peripheral temperatures, and respective lead wires are arranged on the printed board 61. A tip end portion capable of sensing the temperature is accumulated in a clearance 68 formed between a lower cell holder 65 and a cell through a hole formed in an upper cell holder 62 (see FIG. 6). With this arrangement, the temperature sensors TM1, TM2 may be disposed for each block comprising a group of cells. In other words, the temperature sensor TM1 is provided for block A and the temperature sensor TM2 for block B, respectively, and the temperatures within the respective chambers in which the blocks A, B are accumulated, that is, the cell temperatures, maybe detected by the temperature sensors TM1, TM2.

Figure 7A:
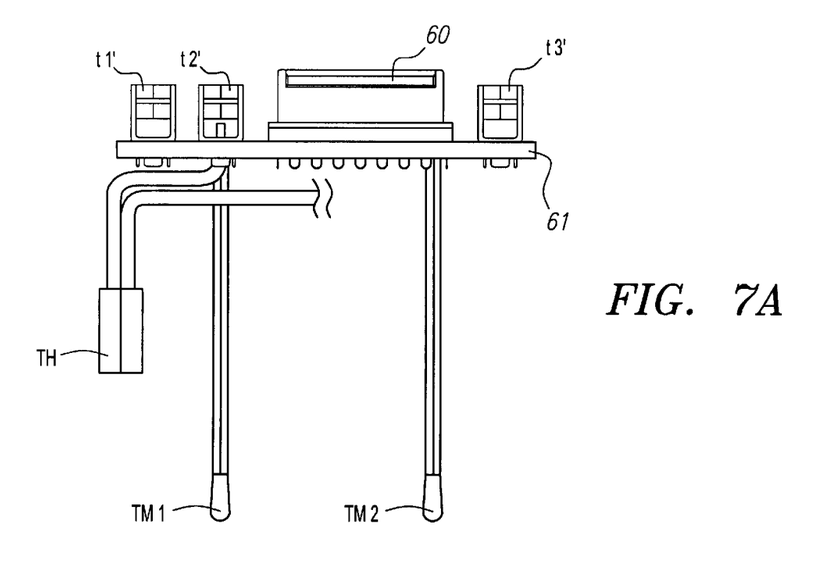
FIG. 7(A) illustrates an external appearance thereof and FIG. 7(B) a view of its circuitry.
Figure 7B:
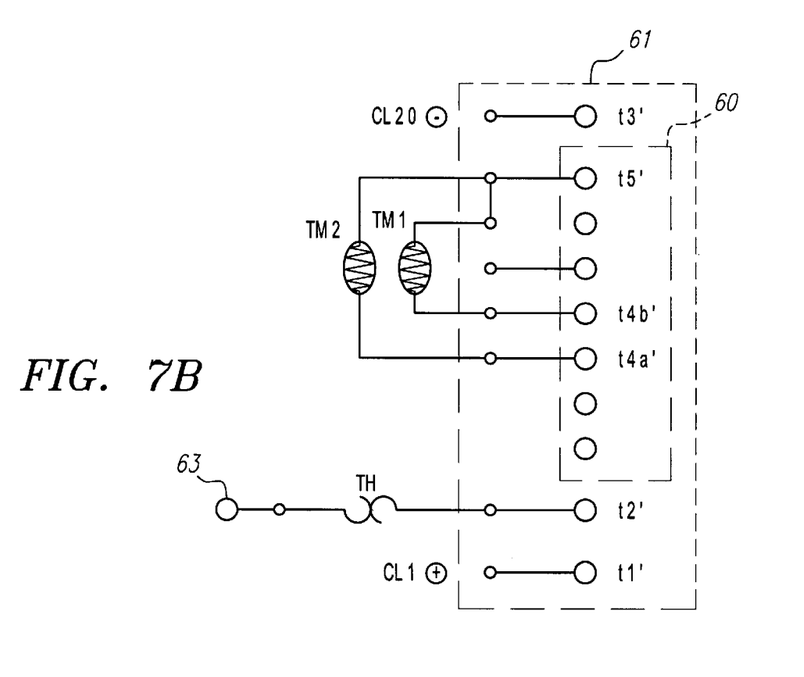

More particularly, the temperature sensors TM1, TM2 respectively output information corresponding to respective cell temperatures for each of the blocks A, B (e.g. resistance values in case of thermistors) to output terminals t4a', t4b' comprising connecting terminals for the connector 60 (see FIG. 7(B)). Note that t5' denotes a common terminal for the temperature sensors TM1, TM2.

The group of cells that is accumulated within the casing 51, the upper cell holder 62 and the lower cell holder 65 maintaining the group of cells will now be explained.

As illustrated in FIG. 5, the group of cells including total 20 cells CL1 to CL20 as a whole is further divided into 10 each to comprise block A (cells CL1 to CL10) and block B (cells CL11 to CL20). Within the blocks A, B, rows of cells divided into 5 each are aligned to form two rows to be accumulated within the casing 51. In other words, 4 rows of cells comprised of 5 cells each are accumulated within the casing 51 to comprise the group of cells. Note that since the cells are nickel metal hydride batteries with an electromotive force of 1.2 V each, it is achieved for an arrangement in which a direct voltage of 24V is generated between positive terminals t1' and negative terminals t3', and a potential difference of 12V is obtained by the central terminals t2' with respect to the positive terminals t1' or the negative terminals t3'.

As illustrated in FIG. 6, the cells CL1 to CL20 aligned in the above-described manner are pinched within the casing 51 between the upper cell holder 62 and the lower cell holder 65 and radiating plates 66 from vertical and lateral directions so as to enclose the entire blocks A, B. More particularly, cell chambers are partitioned and formed for each of the blocks A, B by means of the upper cell holder 62, the lower cell holder 65 and radiating plates 66. With this arrangement of partitioning spaces in which the cells are accumulated per each block, temperatures of the respective blocks may be detected by the temperature sensors TM1, TM2 accumulated in the clearance 68 formed between the lower cell holder 65 and the cells without being affected by the temperature of the other block. It is thus possible to accurately detect the cell temperature of block A by the temperature sensor TM1 and the cell temperature of block B by the temperature sensor TM2.

Figure 4:
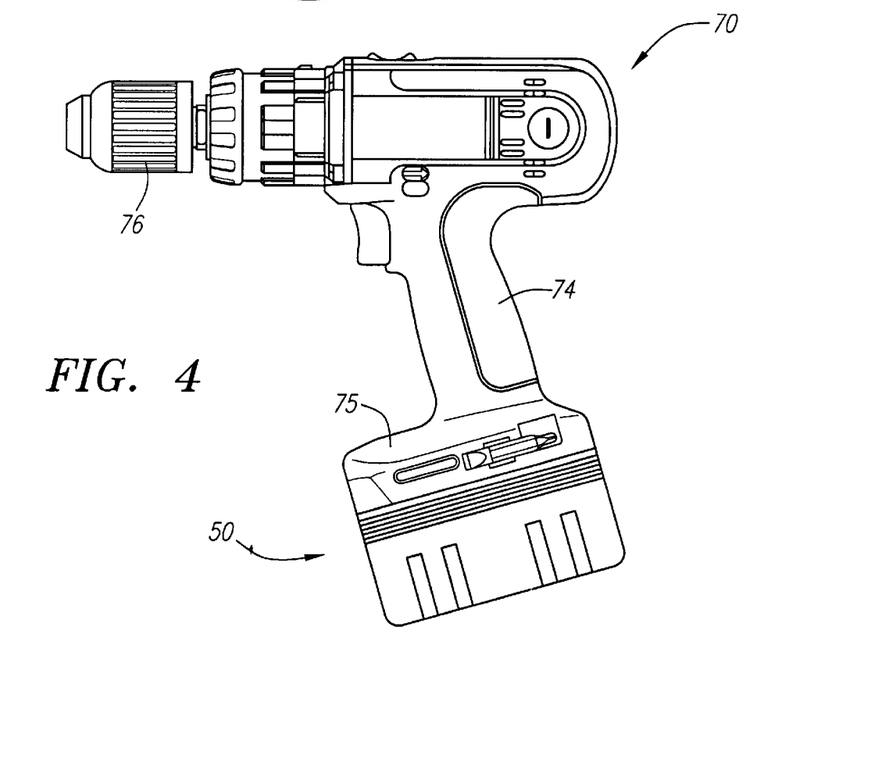
FIG. 4 is a front view of a battery-driven drill using the battery package of FIG. 3.

The thus arranged battery package 50 is used by being attached to the battery-driven drill 70 in a manner as illustrated in FIG. 4. In the battery-driven drill 70, a battery package mounting portion 75 is formed downward of a grip portion 74 that the user may grip. Since the battery package mounting portion 75 is formed with fitting portions that may engage with the fitting portions 52 of the battery package 50 and a specified hook groove that may engage with the hook 54 of the battery package 50, the battery package 50 may be mounted to the battery package mounting portion 75 in a freely attachable and detachable manner.

In the battery-driven drill 70 with the battery package 50 being attached in the above manner, the positive terminals t1' and negative terminals t3' of the battery package 50 will be connected to their respective incoming terminals provided on the battery-driven drill 70 side to thereby receive supply of electricity through both terminals. A chuck 76 may thus be rotated through a motor (not shown). In using the battery-driven drill 70, batteries of which charge has been completed from among a plurality of battery packages 50 are sequentially used to thereby enable successive operation.

It will now be explained for the arrangement of the battery charging device 10 for charging the above-described battery package 50 with reference to FIGS. 1 and 2.

Figure 2:
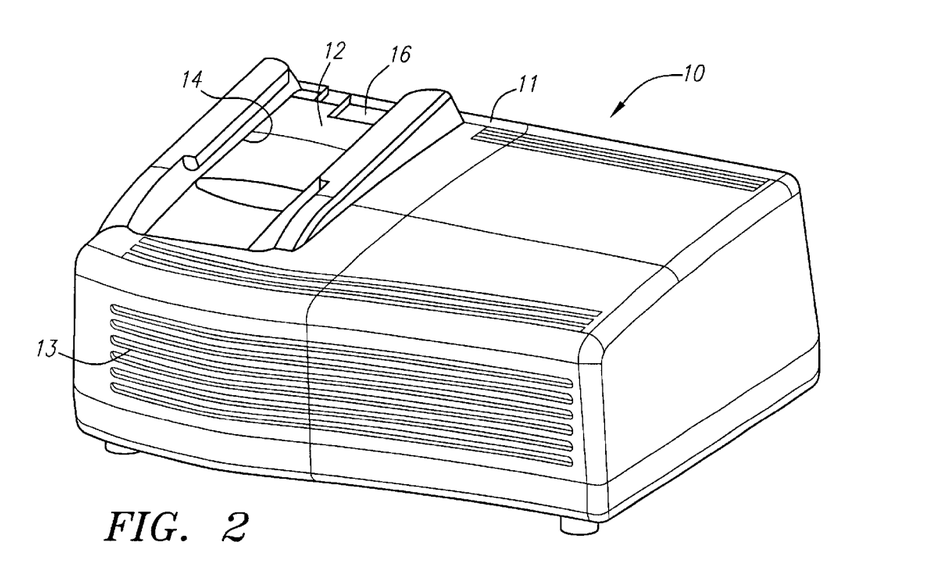
FIG. 2 is a perspective view illustrating an external appearance of the battery charging device according to one embodiment of the present invention.
Figure 3:
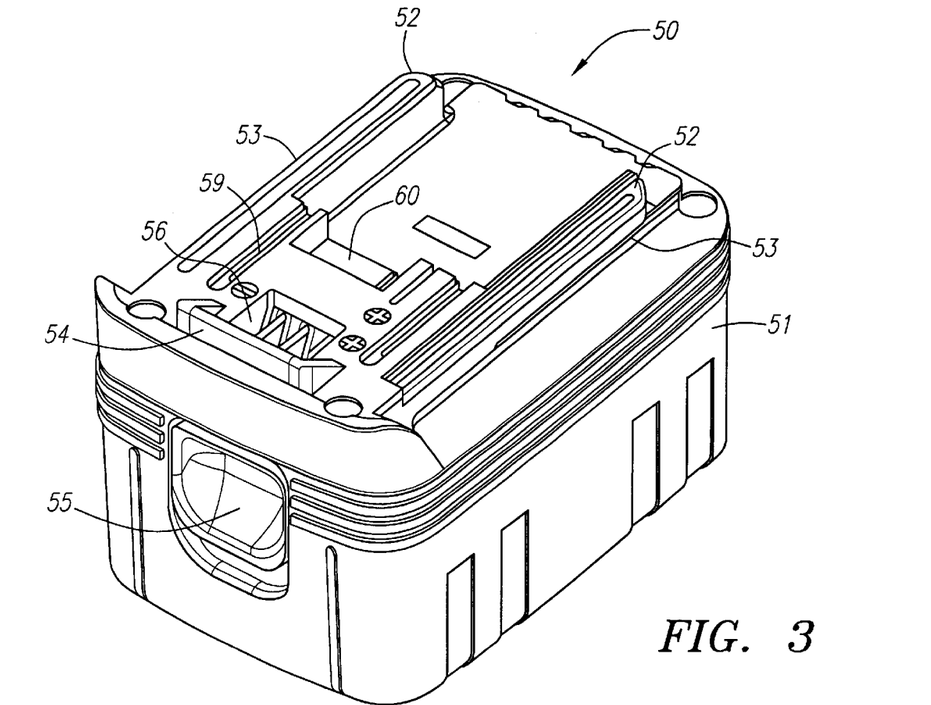
FIG. 3 is a perspective view illustrating an external appearance of a battery package according to one embodiment of the present invention.

As illustrated in FIG. 2, the battery charging device 10 has a box-shaped body 11 made of resin, wherein a fitting portion 12 enabling attachment of the battery package 50 or an air-suction aperture 13 for sucking air from the exterior for sending the air into the battery package 50 by means of the incorporated cooling fan are integrally formed to the box-shaped body 11. The box-shaped body 11 of the battery charging device 10 is further provided with various indicators that are not illustrated in the drawings such as a capacity indicating lamp for indicating a capacity of the battery package 50 during charging operations or other condition indicating lamps for indicating operating conditions of the battery charging device 10, wherein illumination control of these indicators is performed through a control circuit that will be explained later.

The fitting portion 12 is formed with guides 14 for guiding the fitting grooves 53 of the battery package 50 and with an air-blowing outlet 16 that may be communicated to the ventilating outlet 56 of the battery package 50, and the air-blowing outlet 16 is further provided with a specified hook groove with which the hook 54 of the battery package 50 may be engaged. The fitting portion 12 is further provided with output terminals t1, t2 and t3 that are electrically connectable in correspondence to the positive terminals t1', the central terminals t2' and the negative terminals t3' of the battery package 50 and with a connector (not shown) that is connectable to the connector 60 of the battery package 50. With this arrangement, the control circuit within the battery charging device 10 may obtain specified temperature information from the battery package 50 through the connector.

As illustrated in FIG. 1, the control circuit of the battery charging device 10 is mainly comprised of a power source circuit 32, a charge current controlling portion 34, a comparing/determining portion 35, a control portion 36, a current switch controlling portion 37, a temperature detecting portion 38, and a memory portion 39 etc.

The power source circuit 32 is arranged to charge block A by impressing voltage between the positive terminals t1' and the central terminals t2' of the battery package 50 and to charge block by impressing voltage between the central terminals t2' and the negative terminals t3', respectively. The current switch controlling portion 37 functions to switch between blocks A, B for performing charging operations through the power source circuit 32 upon receipt of specified switching instructions from the control portion 36. Thus, the group of cells may be charged upon dividing them into two blocks A and B.

The temperature detecting portion 38 is arranged to detect cell temperature information Ta, Tb within the respective blocks of blocks A, B during charging operations via temperature sensors TM1, TM2. The comparing/determining portion 35 is arranged to compare the cell temperature information Ta of block A and cell temperature information Tb of block B to obtain temperature difference information Tdf and to determine whether the obtained temperature difference information is exceeding a specified reference value for comparison Tref or not. If it then determined by the comparing/determining portion 35 that the temperature difference information Tdf is exceeding the specified reference value for comparison Tref, the control portion 36 acts to terminate the split charge of the battery package 50 by the power source circuit 32 via the charge current controlling portion 34.

On the other hand, the memory portion 39 is for storing current value controlling information such as specified maps or the like, and the control portion 36 is further arranged to calculate, upon obtaining a temperature rising value by differentiating the temperature values output from the temperature detecting portion 38, a specified current value based on the current value controlling information of the memory portion 39 to then output the current value to the charge current controlling portion 34 as a current instructing value. In addition to the afore-mentioned function of terminating split charge, the charge current controlling portion 34 is also capable of controlling the power source circuit 32 based on the current instructing value from the control portion 36 and of adjusting the charge current for the battery package 50.

It should be noted that among the above arrangements the power source circuit 32, the charge current controlling portion 34, the control portion 36, the current switch controlling portion 37, the temperature detecting portion 38, and the memory portion 39 etc., except for the comparing/determining portion 35, are substantially identical to the arrangements for a battery charging device as disclosed in a prior application for patent owned by the applicant of the present invention (Japanese Patent Application No. 11-081247), and this is a basic arrangement for a battery charging device for performing split charge by detecting cell temperatures through temperature sensors TM1, TM2 and by controlling the charge current on the basis of the cell temperatures. Thus, the battery charging device 10 of the illustrated embodiment realizes, through its simple arrangement of additionally providing the comparing/determining portion 35 to the basic arrangement, the ability of detecting abnormalities in cells comprising the battery package 50 to terminate charge accordingly and to further detect inconveniences that may be caused in the battery charging device 10 to terminating charge.

When the battery package 50 is attached to the fitting portion 12 of the battery charging device 10 of the above arrangement, the control portion 36 controls the power source circuit 32, the charge current controlling portion 34, the current switch controlling portion 37, the temperature detecting portion 38 and the memory portion 39 etc through a specified algorithm, and the group of cells within the battery package 50 are charged upon being divided into two blocks A and B. During charging operations, the capacity indicating lamp for indicating the capacity of the battery package 50 is illuminated, and upon completion of charging operations, charging is terminated and this fact is accordingly indicated by the same lamp.

Figure 8:
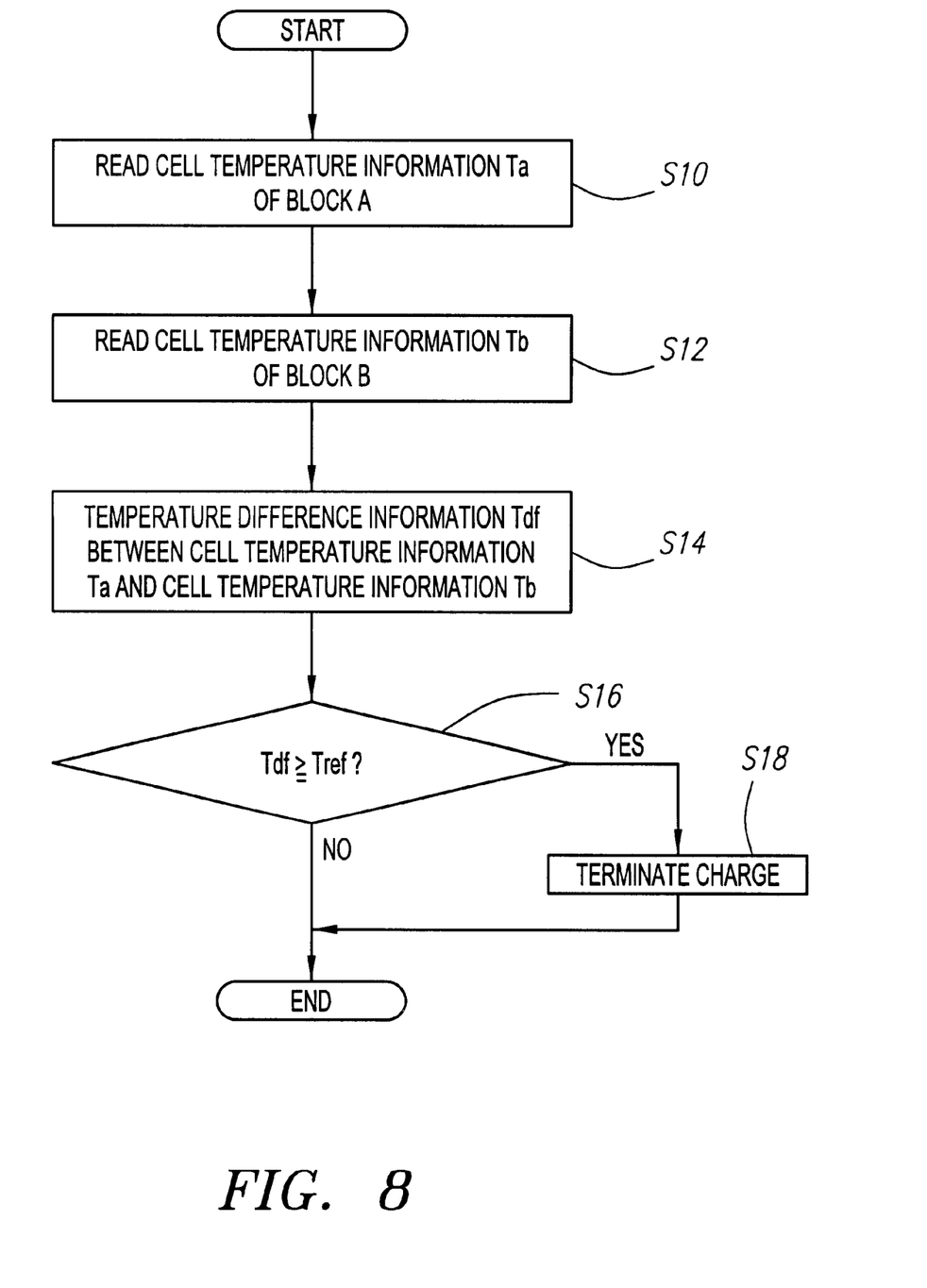
FIG. 8 is a flowchart for showing a flow of processes performed by the control circuit of the battery charging device according to the above embodiment.

During the course of performing the series of divided charging processes on the basis of the specified algorithm, abnormality detecting processes as illustrated in FIG. 8 are performed through interrupt control or the like generated at specified timings. More particularly, when the temperature detecting portion 38 reads cell temperature information Ta of block A and cell temperature information Tb of block B in Steps 10 and 12, the comparing/determining portion 35 calculates a temperature difference between cell temperature information Ta and cell temperature information Tb as temperature difference information Tdf in Step 14. The comparing/determining portion 35 further obtains a size relationship between the calculated temperature difference information Tdf and the preliminarily set reference information for comparison Tref in Step 16. If it is determined that the temperature difference information Tdf is exceeding the reference information for comparison Tref (YES in S16), it is assumed that abnormal heating of cells comprising the block A or block B has occurred during charging operations or dulling in rise in temperature has occurred owing to internal short-circuiting of the cells to therefore proceed to Step 18 whereupon the control portion 36 issues charge terminating instructions to the charge current controlling portion 34. With this arrangement, charging of the battery package 50 through the power source circuit 32 is terminated and indications are made through the condition indicating lamp for indicating operating conditions of the battery charging device 10 that an abnormality has occurred. On the other hand, in case the temperature difference information Tdf does not exceed the reference information for comparison Tref (NO in s16), no abnormalities are found in the battery package 50 or other members so that the abnormality detecting processes are terminated to proceed with the specified algorithm and to continue charging processes for the battery package 50.

It should be noted that since the battery charging device 10 of the illustrated embodiment employs a method of performing charge upon dividing the battery package 50 into blocks A and B, it is possible to detect the following conditions besides the occurrence of the above-described abnormalities in cells during charging operations if it is determined in Step 16 that the temperature difference information Tdf is exceeding the reference information for comparison Tref: (1) breakdown of temperature sensors TM1, TM2 incorporated in the battery package 50, (2) deficiencies in connection of output terminals T4$a$', t4$b$' of the temperature sensors TM1, TM2 within the connector 60 or other members, and (3) breakdown of charge circuits such as the power source circuit 32 or the current switch controlling portion 37 or the like.

While it has been determined in the above-described Step 16 whether the temperature difference information Tdf is exceeding the reference information for comparison Tref, it is alternatively possible to determine whether the temperature difference information Tdf is less than the reference information for comparison Tref, and to perform control to terminate charging processes in Step 18 if it is not less than the reference information for comparison Tref. It is still further possible to set reference information for comparison Tref for defining upper and lower limits for the temperature difference information Tdf and to perform to terminate charging processes in Step 18 in case the temperature difference information Tdf does not fall into this range.

As explained so far, the battery charging device 10 of the illustrated embodiment is arranged in that the cell temperature information Ta and cell temperature information Tb within respective blocks A and B are detected during charging operations through temperature sensors TM1, TM2 and temperature detecting portion 38 incorporated in the battery package 50, in that the cell temperature information Ta of block A and cell temperature information Tb of block B are compared through the comparing/determining portion 35 wherein upon determining that temperature difference information Tdf is exceeding the reference information for comparison Tref, instructions for terminating charging operations are sent from the control portion 36 to the charge current controlling portion 34 assuming that abnormalities have occurred in the cells comprising the block A or block B during charging operations.

In other words, through a relative simple arrangement of additionally providing a comparing/determining portion 35 to a battery charging device for performing split charge by detecting cell temperatures through temperature sensors TM1, TM2 and by controlling the charge current on the basis of the detected cell temperatures, determination is performed by obtaining temperature difference information Tdf during charging operations. With this arrangement, it is possible to detect cells whose temperature does not rise or fall within a specified range together with remaining cells within the same block. It is accordingly possible to detect a block including abnormal cells, to detect inconveniences of charge circuits or the like that performs charge upon division into respective blocks, and to terminate charging operations for the battery package 50. It is thus possible to exhibit the effect of detecting abnormalities in cells comprising the battery package 50 and to terminate charging operations. It is further possible to exhibit the effect of detecting inconveniences that may be generated in the battery charging device 10 and to terminate charging operations.

In an invention, a temperature detecting portion detects cell temperatures within groups of cells in charging operations for each of groups of cells in which a plurality of cells has been divided into 2 or more, a comparing portion compares the cell temperature of one group of cells with that of another group of cells, a determining portion determines whether a temperature difference between cell temperatures as compared by the comparing portion is exceeding a specified value or not, and when it is determined by the determining portion that the temperature difference between cell temperatures is exceeding the specified value, charging of the batteries is terminated by a control portion. More particularly, charging of the batteries is terminated when it is determined that the temperature difference between the cell temperature of one group of cells and the cell temperature of another group of cells is exceeding a specified value. In this manner, by performing determination of cell temperature differences during charging operations through a relatively simple arrangement comprised of the temperature detecting portion, the comparing portion, determining portion and the control portion, it is possible to detect a group of cells including cells whose temperature does not rise or fall within a specified range similarly to remaining cells within the same group of cells, that is, abnormal cells and to terminate charging of the batteries. It is therefore possible to exhibit the effect of detecting abnormalities in cells comprising the batteries through a simple arrangement and of accordingly terminating charging operations.

In an invention, a temperature detecting portion detects cell temperatures within groups of cells in charging operations for each of groups of cells in which a plurality of cells has been divided into 2 or more, a comparing portion compares the cell temperature of one group of cells with that of another group of cells, a determining portion determines whether a temperature difference between cell temperatures as compared by the comparing portion is exceeding a specified value or not, and when it is determined by the determining portion that the temperature difference between cell temperatures is exceeding the specified value, charging of the batteries is terminated by a control portion. More particularly, charging of the batteries is terminated when it is determined that the temperature difference between the cell temperature of one group of cells and the cell temperature of another group of cells is exceeding a specified value. In this manner, by performing determination of cell temperature differences during charging operations through a relatively simple arrangement comprised of the temperature detecting portion, the comparing portion, the determining portion and the control portion, it is possible to detect cells including cells whose temperature does not rise or fall within a specified range similarly to remaining cells within the same group of cells. It is therefore possible to detect a group of cells including abnormal cells, to detect inconveniences of the charge circuit or the like for performing charge upon dividing into respective groups of cells, and to terminate charging operations of the batteries. It is therefore possible to exhibit the effect of detecting inconveniences that may occur in the battery charging device and to terminate charge accordingly in addition to the effect of detecting abnormalities in cells comprising the batteries and terminating charge through a simple arrangement.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A battery charging device for charging batteries comprised of a plurality of cells, the battery charging device comprising:

a temperature detecting portion for detecting cell temperatures during charging operations within groups of cells for each of groups of cells in which a plurality of cells has been divided into two or more, a comparing portion for comparing the cell temperature of one group of cells with that of another group of cells, a determining portion for determining whether a temperature difference between the cell temperatures as compared by the comparing portion is exceeding a specified value or not, and a control portion for terminating charge when it is determined by the determining portion that the temperature difference between cell temperatures is exceeding the specified value.

2. A battery charging device for performing charge of batteries comprised of a plurality of cells upon dividing the cells into two or more groups of cells, the battery charging device comprising:

a temperature detecting portion for detecting cell temperatures during charging operations within groups of cells for each of groups of cells, a comparing portion for comparing the cell temperature of one group of cells with that of another group of cells, a determining portion for determining whether a temperature difference between the cell temperatures as compared by the comparing portion is exceeding a specified value or not, and a control portion for terminating charge when it is determined by the determining portion that the temperature difference between cell temperatures is exceeding the specified value.

* * * * *